Aug. 16, 1966 D. P. KEMP 3,266,083
APPARATUS FOR MAKING BLOWN PLASTIC ARTICLES
Filed July 5, 1963 4 Sheets-Sheet 1

INVENTOR.
DONALD P. KEMP
BY Spencer L. Blaylock, Jr.
W. A. Schaich
ATTORNEYS

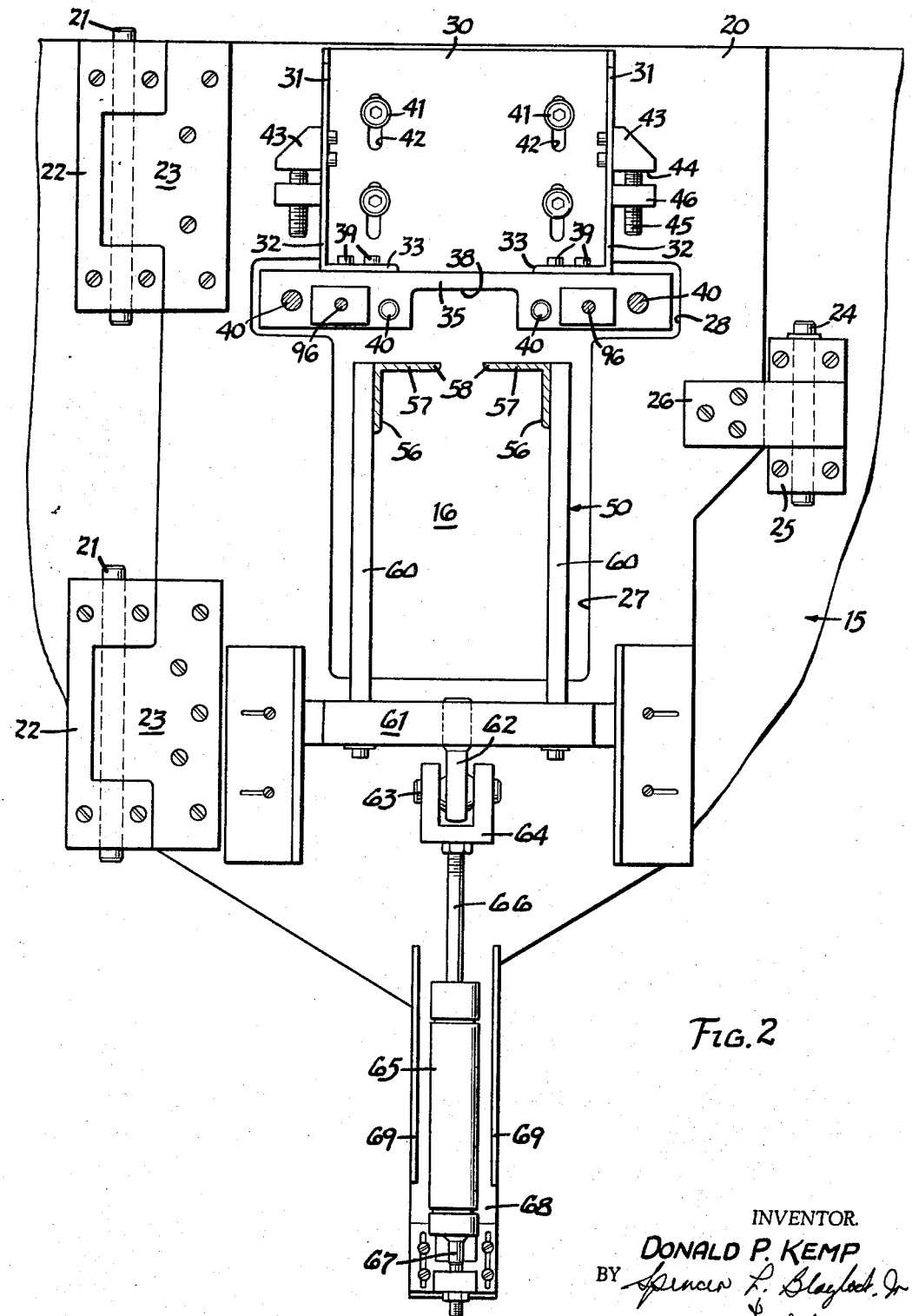

INVENTOR.
DONALD P. KEMP
BY
ATTORNEYS

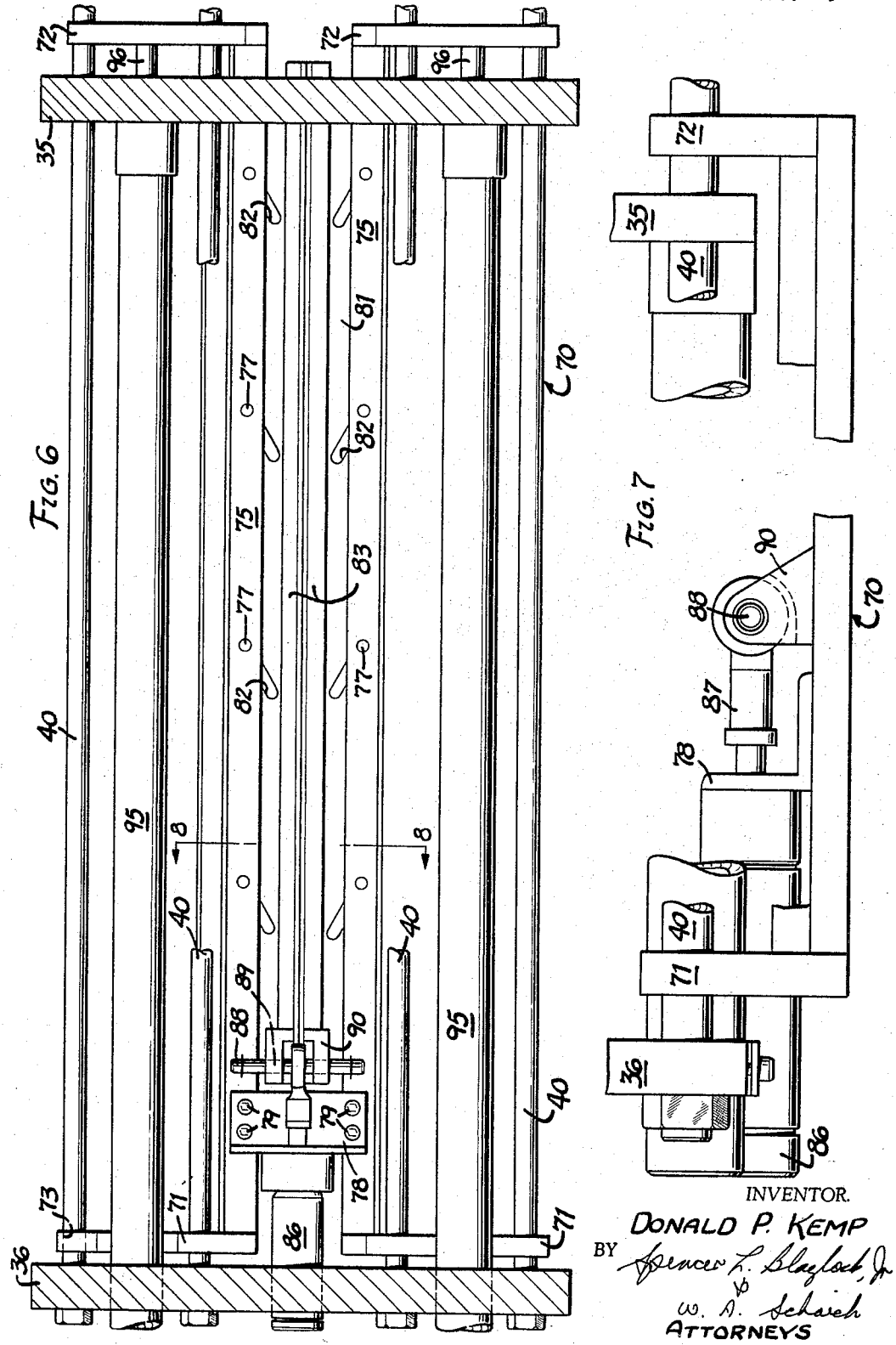

United States Patent Office 3,266,083
Patented August 16, 1966

1

3,266,083
APPARATUS FOR MAKING BLOWN PLASTIC ARTICLES
Donald P. Kemp, Perrysburg, Ohio, assignor to Owens-Illinois Glass Company, a corporation of Ohio
Filed July 5, 1963, Ser. No. 293,101
5 Claims. (Cl. 18—1)

The present invention relates to an apparatus for making blown plastic articles. More particularly, the present invention relates to a novel apparatus for removing articles from a forming machine in which the articles are formed in an inverted position.

The instant invention proposes a novel "take-out" or article removal mechanism for utilization with plastic forming machines, such as the machine disclosed in the copending application of Hans G. Stenger, Serial No. 254,106, filed in the United States Patent Office on January 28, 1963, and assigned to the assignee of the present invention.

In the above-identified plastic forming machine, blown plastic articles are manufactured by a combined injection, extrusion and blowing technique whereby the article is manufactured in a position inverted with respect to its normal, in-use orientation, in order that certain manufacturing advantages may be obtained. The removal of the formed articles from the forming apparatus is complicated by the inverted position of the articles and further is complicated by the attachment of the articles to the forming machine by means of "waste" portions joining the article to the extrusion orifices.

Generally, the present invention proposes the removal of one or more such articles from a forming machine in which the articles are joined by integral waste portions to forming machine orifices by gripping and moving the articles from the forming machine to a remote location, retaining the articles in their inverted positions during such removal, pulling the articles downwardly relative to the engaged waste portions, and allowing the articles to fall freely and serially from the still-engage waste portions.

The mechanism of the present invention involves a movable carriage having means for engaging the waste portions only of each of the articles and also having an abutment means interposed between the means engaging the waste portions and the articles, so that the engaging means and the abutment means can be relatively moved to tear the waste portions from the articles and to allow the articles to fall free of the still-engaged waste portions.

It is, therefore, an important object of the present invention to provide a new and novel apparatus for removing formed plastic articles from a plastic forming machine.

Another important object of this invention is the provision of an improved apparatus for the removal of formed plastic articles from a forming apparatus in which the articles are formed in an inverted position and wherein the articles are engaged and removed from the forming apparatus while still in their inverted positions without engaging the articles, per se, and prior to the removal of waste portions by which the articles were initially joined to the forming apparatus.

It is a further important object of this invention to provide an improved article removal apparatus for simultaneously engaging the waste portions only of a plurality of inverted articles, jointly removing all of the articles and the still-attached waste portions from the forming apparatus, and subsequently relatively moving the articles and the waste portions to remove the articles therefrom.

It is yet another, and no less important, object of the present invention to provide a new and novel apparatus

2 for removing plastic articles from a forming apparatus, the articles being so oriented that they are inverted relative to their normal, in-use orientation, by engaging only waste portions of the articles during their removal from the forming apparatus and subsequently relatively moving the waste portions and the articles so that the articles fall free of the removal apparatus.

Other objects of this invention will appear in the following description and appended claims, reference being had to the accompanying drawings forming a part of this specification wherein like reference characters designate corresponding parts in the several views.

On the drawings:

FIGURE 2 is a vertical sectional view taken along the plane 2—2 of FIGURE 1;

FIGURE 6 is a view taken along the plane 6—6 of FIGURE 1;

FIGURE 7 is a side elevational view, with parts broken away and in section, of the portion of the apparatus illustrated in FIGURE 6 of the drawings.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figures 1, 8:
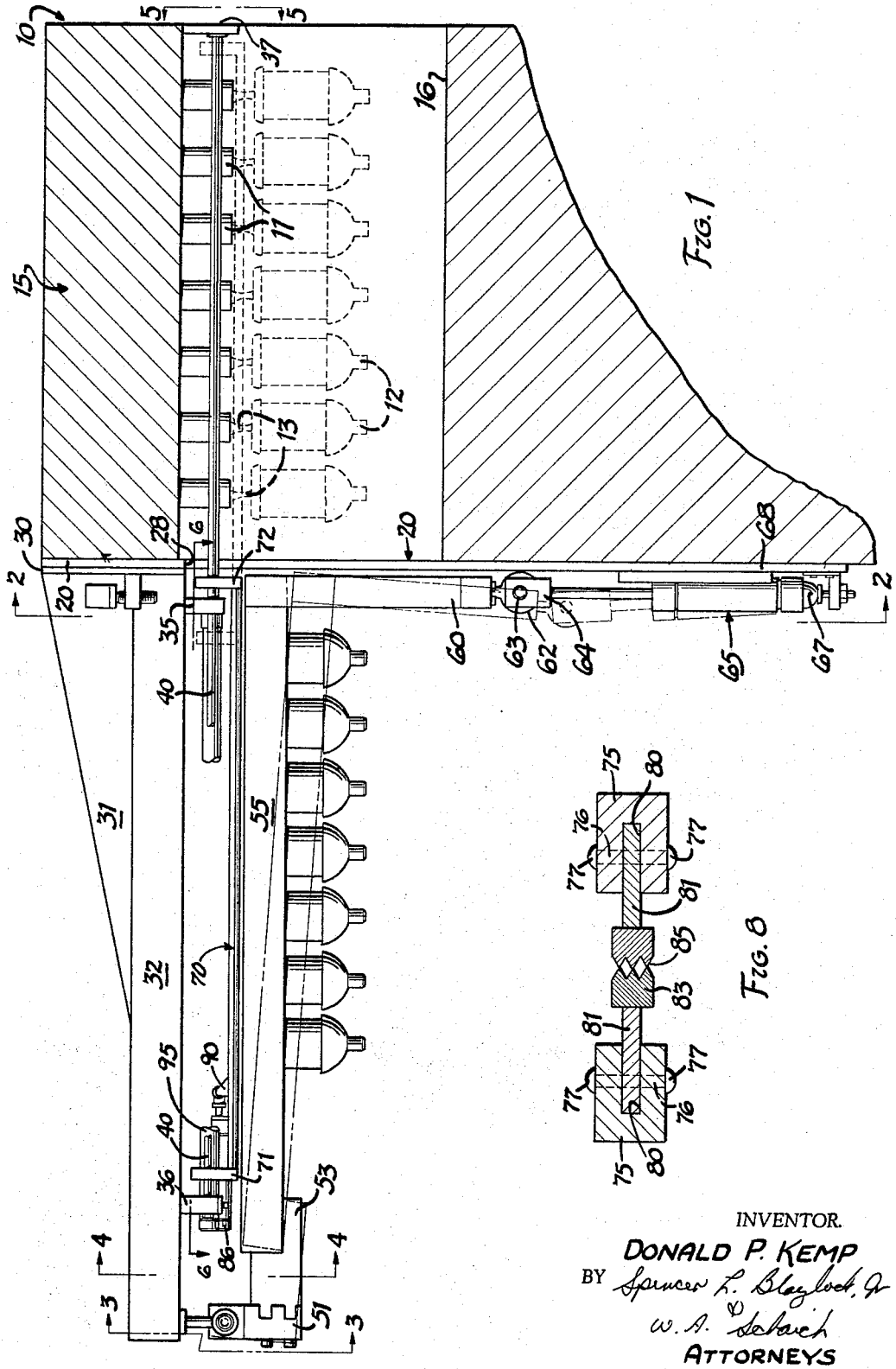
FIGURE 1 is a side elevational view, partially schematic in nature, illustrating an article removal apparatus of the present invention.
FIGURE 8 is an enlarged sectional view taken along the plane 8—8 of FIGURE 6.

As shown on the drawings:

In FIGURES 1 and 2, reference numeral 10 refers generally to a forming machine of the type illustrated and described in the above-identified Stenger application having a plurality of downwardly facing orifice blocks or bushings 11 from which plastic material is expressed to be processed by a combined injection, extrusion and blowing operation to form blown containers or other articles 12 still joined to the orifice blocks 11 by waste portions 13. For the practice of the present invention and for the purposes of the instant application, the specific injection, extrusion and blowing process need not be disclosed, it merely being necessary to note that the articles 12, at the conclusion of the process, depend vertically from the orifice blocks 11 and remain attached thereto through the waste portions 13. The orifice blocks 11 are carried by a main machine frame 15 and the articles 12 depend into an opening 16 formed by the various machine components.

Secured to one end face of the main machine frame 15 is a take-out mounting plate 20, best illustrated in FIGURES 1 and 2. As illustrated, this plate 20 is pivotally movable in a horizontal plane to an inoperative position about a vertical axis defined by pivot pins 21 carried by hinge elements 22 mounted on the main frame of the machine and cooperating hinge elements 23 secured to a plate. The plate is latched in its illustrated, operative position by means of a retaining pin 24 carried by a bifurcated latch element 25 mounted on the main frame and a central latch element 26 mounted on the plate 20.

Further, it will be noted that the plate is provided with a generally rectangular aperture 27 located centrally thereof and laterally aligned with the space 16 in the machine frame 15. This aperture 27 is enlarged laterally at its upper end, as at 28.

Carried by the plate 20 in flatwise contact therewith above the enlarged portion 28 of the aperture 27 is a bracket 30 having secured thereto a pair of parallel, vertical side plates 31 welded, or otherwise fixedly secured, to a pair of horizontally extending angle irons 32, these angle irons 32 having inturned lower ends 33 which are horizontal and which serve to support a pair of longitudinally spaced support brackets 35 and 36. A third such support bracket 37 is secured to the machine frame 15 adjacent that edge thereof remote from the edge to which the plate 20 is attached, as best seen in FIGURE 1. These three brackets 35, 36 and 37 are all generally rectangular in outline and the brackets 35 and 36 are each provided with a downwardly opening recess 38 for a purpose to be hereafter more fully described. The brackets 35 and 36 are each secured to the horizontal portions 33 of the angle irons 32 by suitable means, as by cap screws 39.

The brackets 35, 36 and 37 serve to support thereon a plurality of guide rods 40, these rods being horizontal and serving to suspend thereon for horizontal displacement the take-out mechanism to be hereafter more fully described. The brackets 35 and 36, and the rods 40 carried thereby, are vertically adjustable relative to the orifice bushings 11 by means of the plate 30 which is secured to the plate 20 by cap screws 41 extending through vertically elongated slots 42. Secured to the side plates 31 are reaction blocks 43 having lower reaction surfaces 44 receiving thereagainst set screws 45 threaded through adjustment blocks 46 secured to the plate 20. The adjustment of the brackets 35 vertically can be readily accommodated by loosening the cap screws 41 and adjusting the set screws 45 to position the block 43 at the desired height.

Figure 3:
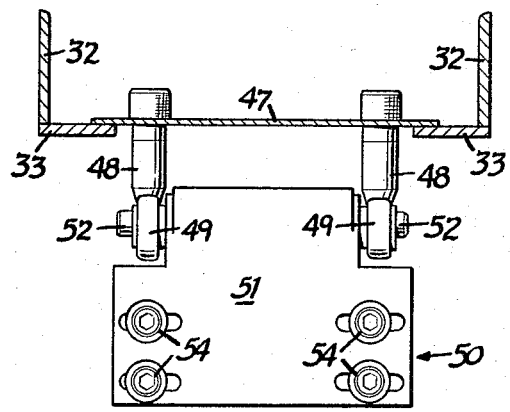
FIGURE 3 is a sectional view, with parts shown in elevation, taken along the plane 3—3 of FIGURE 1.
Figure 4:
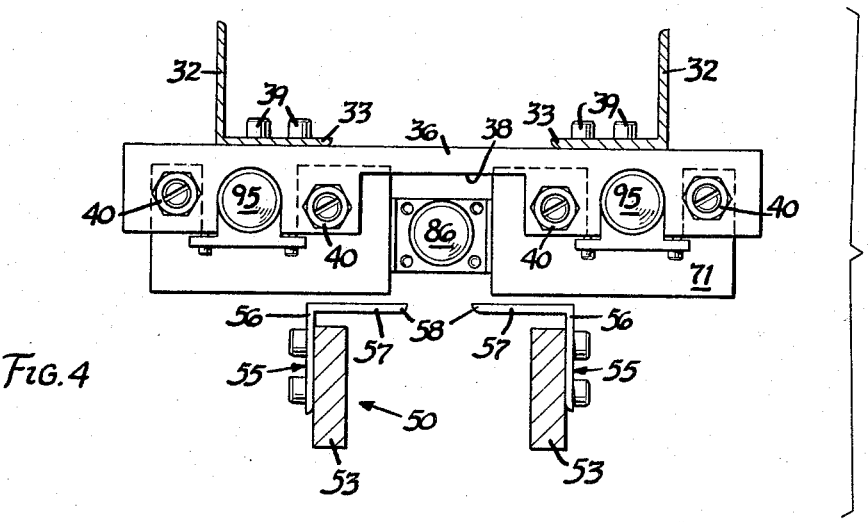
FIGURE 4 is a view taken along the plane 4—4 of FIGURE 1.
Figure 5:
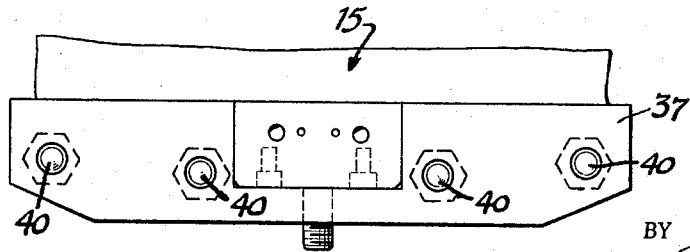
FIGURE 5 is a view taken along the plane 5—5 of FIGURE 1.

The free ends of the support elements 33 carry at their outer ends a transverse support plate 47 (FIGURE 3) from which depends a pair of support pins 48 provided at their lower ends with pivot bearings 49 pivotally mounting a stripping frame 50 therebetween. More particularly, this stripping frame 50 includes an end journal block 51 having an upper transverse pivot pin 52 journaled in the bearings 49. Secured to one face of the block 51, as by cap screws 54, are a pair of side plates 53 (FIGURE 4). The forwardly projecting side plates 53 carry at their upper edges stripper plates 55, these stripper plates being in the form of angle irons having vertical legs 56 secured to the side plates 55 and horizontal legs 57 inwardly directed toward one another with their terminal edges 58 spaced for a reason to be hereinafter more fully described.

The stripper plates 55 project forward freely from the side plates 53 and are joined at their forward ends to an actuating frame (FIGURE 2) comprising a pair of vertical frame members 60 joined at their lower ends to a horizontal frame member 61 having a medially mounted, depending mounting bracket 62 carrying a transverse pivot pin 63 which is received between the mounting clevice 64 of a fluid pressure actuated cylinder 65 having a vertically reciprocable actuating rod 66 carrying the clevice 64. The cylinder 65 has its lower end pivoted, as through an attachment bracket 67, to a depending, U-shaped frame 68 secured to the plate 20. Upon actuation of the cylinder 65, the stripping frame 57 will be actuated from its full line position of FIGURE 1 to its dotted line position, the plate 61 being vertically movable and being guided between a pair of transversely spaced guide elements 69 on the side plate 20.

Mounted on the guide rods 40 for longitudinal displacement thereon is a take-out carriage best illustrated FIGURES 6 and 7. This take-out carriage 70 comprises a pair of identical side assemblies each including rear and forward plates 71, 72, respectively, these plates being apertured, as at 73, to slidably receive the guide rods 40 therethrough. The plates 71 and 72 are joined by fixed longitudinally extending gripper carrier elements 75, each bearing a plurality of vertical pivot pins 76 secured thereto by enlarged heads 77 (FIGURE 8). The elements 75 are secured together by an angle iron bracket 78 for a purpose to be hereafter more fully described, the bracket being secured to the elements 75 by suitable means, as by cap screws 79. Since the plates 71, 72 and the elements 75 form subassemblies each guided by a plurality of rods 40, there is substantially no load imposed on the joining bracket 78.

The longitudinally extending elements 75 are thus laterally spaced and have their confronting faces grooved, as at 80, to receive therein gripper plates 81 (FIGURE 8). These gripper plates 81 are provided with inclined cam slots 82 through which the pivot pins 76 project, respectively. The facing inner edges of the plates 81 carry gripping elements 83 provided with confronting, normally spaced serrated gripping edges 85.

Mounted on the bracket 78 is a single, longitudinally extending actuating cylinder 86 having its actuating rod 87 projecting forwardly through the bracket 78 and carrying at its forward end a laterally projecting slide pin 88. The slide pin 88 is medially secured to the piston rod 87 and projects laterally through slide apertures 89 and formed in separate brackets 90, one such bracket 90 being mounted upon each of the gripper plates 81.

It will be readily apparent that longitudinal displacement of the rod 87 to the right, as viewed in FIGURES 6 and 7, will move the gripping plates 81 also to the right, contact between the cam slots 82 and the pins 76 moving the serrated gripping edges 85 carried by the plates 81 to their spaced apart position. Such movement is guided by the brackets 90 sliding laterally on the pin 88.

The complete take-out assembly is actuated from its retracted position of FIGURE 1 to its advanced, dotted position by a pair of actuating cylinders 95. The cylinders 95 are supported on brackets 35, 36 and the actuating rods 96 thereof are secured to the bracket or front plate 72 of the take-out assembly adjacent the cylinder.

*Operation*

The operation of the device of the present invention will be readily apparent by comparison of the solid line position and the dotted line positions of FIGURE 1 of the drawings.

Initially, the articles, such as bottles 12, are joined to the orifice bushings 11 by the waste portions 13, the articles 12 being inverted, e.g., with the container necks downward, after the blow molds have been opened in the conventional manner, as described in the above-identified Stenger application.

Next, the actuating cylinders 95 are actuated to insert the carriage 70 into the aperture 16 of the main machine frame, such movement being guided by the rods 40. The insertion of the frame to its full dotted line position interposes the waste portions 13 of the containers 12 between the retracted gripping edges 85.

Next, the cylinder 86 is actuated to retract the rod 87, the cam slots 82 and the cam pins 77 cooperating to bring the gripping edges 85 into engagement with the waste portions 13. Upon retraction of the actuating cylinders 95, the actuating rods 96 thereof will retract the carriage to its position exterior of the main machine frame and from the aperture 16. Such displacement of the carriage in engagement with the waste portions will tear the waste portions from the still-hot plasticized material in the orifice bushings 11, thus freeing the articles 12 and the waste portions 13 integral therewith from the orifice bushings.

Upon such retractive movement of the carriage 70, the waste portions 13 of the containers 12, still engaged by the gripping edges 85, are positioned above the stripper plates 55. The waste portions 13 depend through the space between the inner edges 58 of the horizontal legs 57, so that the container 12 lies beneath the stripper plates 55.

After full retraction of the carriage 70, the cylinder 65 is actuated to pivot the stripping frame 50 about the pivot pin 52 to the dotted position of FIGURE 1. The legs 57 of the stripper plates 55 thus contact the bottoms of the containers and pull the containers down while the waste portions 13 remain clamped between the clamp edges 85. The pivoting of the stripper frame 50 about the remote pivot pin 52 causes the containers 12 to be progressively and arcuately torn from the waste portions, and the containers drop freely vertically and in sequence into a chute (not shown) or similar conveying mechanism.

After the articles 12 have been removed from the waste portions 13, the cylinder 78 is actuated to extend the piston rod 87, thus spacing the gripping edges 85 and releasing the waste portions or "tails" so that they may fall freely from the mechanism.

I claim:

1. In an apparatus for removing integral waste portions from a plurality of formed plastic articles retained on a movable carriage by means on said carriage engaging the waste portions only of each of said articles, the articles freely depending from the carriage, the improvements of an abutment plate underlying the carriage and interposed between said waste portions and said articles to engage the articles only upon relative movement of the engaging means and said plate, and means for relatively moving said engaging means and said abutment plate to tear the waste portions from the articles, so that the articles fall freely from the carriage.

2. In an apparatus for removing integral waste portions from a plurality of formed plastic articles retained on a movable carriage by means on said carriage engaging the waste portions only of each of said articles, comprising a pair of spaced abutment plates located in the path of said carriage between which said waste portions are interposed upon movement of said carriage, said abutment plates being positioned to contact the articles upon relative movement of the engaging means and the plates, and means for relatively moving said engaging means and said abutment plates.

3. In an apparatus for removing integral waste portions from a plurality of formed plastic articles retained in a forming machine by said waste portions, a movable carriage, means for displacing said carriage into and out of said machine, means on said carriage engaging the waste portions only of each of said articles, movement of said carriage out of said machine jointly removing all of said articles from the machine, a pair of spaced abutment plates located in the path of said carriage between which said waste portions are interposed upon displacement of said carriage out of said machine, said abutment plates being positioned to contact the articles upon relative movement of the engaging means and the plates, and means for relatively moving said engaging means and said abutment plates.

4. In an apparatus for removing integral waste portions from a plurality of formed plastic articles, the improvement comprising:
a movable carriage from which said plurality of articles freely depend;
means retaining said plurality of articles on said carriage by engaging the waste portions from each of said articles;
a member in the path of the carriage and underlying the carriage and operable to be interposed between said integral waste portions and said articles and engage the articles conditionable upon relative movement of the engaging means and said member;
means conditioning said member for operation by relatively moving said member with respect to said engaging means;
said conditioning means and said member cooperating to tear the waste portion from the article while inducing the article to fall freely from the carriage.

5. In an apparatus for removing integral waste portions from a plurality of formed plastic articles, the improvements comprising:
means retaining said plurality of formed plastic articles on a movable carriage by engaging the waste portions of each of said articles, the articles freely depending from the carriage;
a member underlying the carriage and interposed between said waste portions and the articles engaging the article conditionable upon relative movement of the member and said engaging means;
means conditioning said member for operation by moving said member in a relatively smooth continuous arcuate motion with respect to said engaging means;
said conditioning means and said member cooperating to tear the waste portions from the article while inducing the article to fall freely from the carriage.

References Cited by the Examiner
UNITED STATES PATENTS
3,040,376   6/1962   Elphee _____ 264—161

ROBERT F. WHITE, *Primary Examiner.*
ALFRED L. LEAVITT, *Examiner.*
S. A. HELLER, *Assistant Examiner.*